US008872755B2

(12) United States Patent
Kobayashi

(10) Patent No.: US 8,872,755 B2
(45) Date of Patent: Oct. 28, 2014

(54) MOBILE ELECTRONIC DEVICE WITH LUMINANCE CONTROL ACCORDING TO SURROUNDING BRIGHTNESS AND CONTACT

(75) Inventor: Kazuhiko Kobayashi, Osaka (JP)

(73) Assignee: KYOCERA Corporation, Kyoto (JP)

( * ) Notice: Subject to any disclaimer, the term of this patent is extended or adjusted under 35 U.S.C. 154(b) by 327 days.

(21) Appl. No.: 13/335,386

(22) Filed: Dec. 22, 2011

(65) Prior Publication Data

US 2012/0162110 A1  Jun. 28, 2012

(30) Foreign Application Priority Data

Dec. 24, 2010  (JP) ................. 2010-288565

(51) Int. Cl.
G09G 3/36 (2006.01)
G06F 1/16 (2006.01)
G09G 3/34 (2006.01)

(52) U.S. Cl.
CPC ............ *G06F 1/1643* (2013.01); *G06F 1/1684* (2013.01); *G09G 2380/14* (2013.01); *G09G 2330/022* (2013.01); *G09G 2360/144* (2013.01); *G09G 2320/0626* (2013.01); *G09G 3/3406* (2013.01)
USPC .......................................... 345/102; 345/173

(58) Field of Classification Search
CPC .................. G09G 3/3406; G09G 3/34; G09G 2320/0626; G09G 2320/0633; G09G 2320/064; G09G 2320/0646; G09G 2320/0653
USPC .......................................... 345/102, 173–178
See application file for complete search history.

(56) References Cited

U.S. PATENT DOCUMENTS

2005/0134194 A1  6/2005  Murata
2006/0192748 A1*  8/2006  Lowles et al. ................. 345/102
2006/0192766 A1*  8/2006  Nakamura et al. ............ 345/173
2008/0165115 A1*  7/2008  Herz et al. .................... 345/102
2010/0177111 A1  7/2010  Abe
2010/0289784 A1*  11/2010  Fujioka et al. ................ 345/207
2011/0074690 A1*  3/2011  Broga et al. .................. 345/169
2012/0050307 A1*  3/2012  Mahowald et al. ........... 345/590

FOREIGN PATENT DOCUMENTS

| JP | H10-282923 A | 10/1998 |
| JP | 2004-348076 A | 12/2004 |
| JP | 2005-181562 A | 7/2005 |
| JP | 2007-079113 A | 3/2007 |
| JP | 2008-070699 A | 3/2008 |
| JP | 2010-166260 A | 7/2010 |

OTHER PUBLICATIONS

Office Action dated Jun. 17, 2014, issued in corresponding Japanese patent application No. 2010-288565.

* cited by examiner

*Primary Examiner* — Liliana Cerullo
(74) *Attorney, Agent, or Firm* — Procopio, Cory, Hargreaves & Savitch LLP

(57) ABSTRACT

A luminance control device and method are disclosed. A surrounding brightness of a touch panel is measured to obtain a measured surrounding brightness. A luminance of the touch panel is controlled during a first time period starting from when the measured surrounding brightness changes from a first condition to a second condition, during which the measured surrounding brightness decreases by an amount equal to or greater than a threshold value. The luminance of the touch panel is maintained at a first luminance corresponding to the first condition when the measured surrounding brightness changes from the second condition to the first condition. The luminance of the touch panel is controlled to change to a second luminance corresponding to the second condition, when the measured surrounding brightness has not changed from the second condition to the first condition.

18 Claims, 10 Drawing Sheets

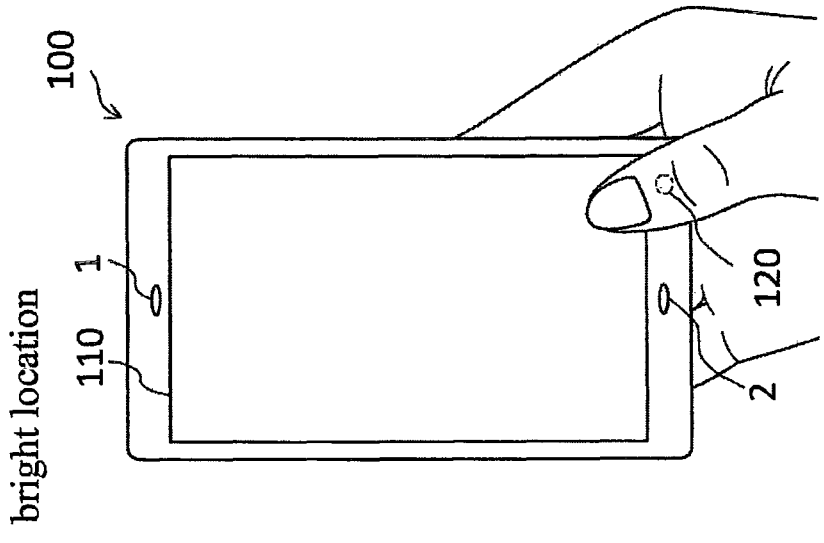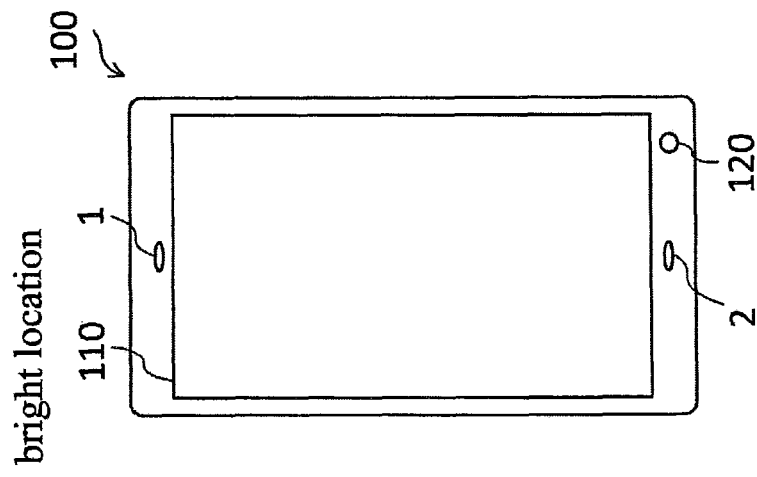

MOBILE ELECTRONIC DEVICE WITH LUMINANCE CONTROL ACCORDING TO SURROUNDING BRIGHTNESS AND CONTACT

CROSS-REFERENCE TO RELATED APPLICATION

The present application claims priority under 35 U.S.C. §119 to Japanese Patent Application No. 2010-288565, filed on Dec. 24, 2010, entitled "MOBILE TERMINAL, METHOD FOR CONTROLLING BRIGHTNESS, AND PROGRAM FOR CONTROLLING BRIGHTNESS". The content of which is incorporated by reference herein in its entirety.

FIELD

Embodiments of the present disclosure relate generally to mobile electronic devices, and more particularly relate to controlling brightness of a display on a touch panel of a mobile electronic device.

BACKGROUND

A user may perform an operation on a touch panel of a mobile electronic device at an initial brightness of the touch panel. If the user performs repeated operations on the touch panel, the initial brightness may be maintained throughout the repeated operation. However, brightness surrounding the touch panel may affect visibility of the touch panel. For example, when the user operations on the touch panel are being performed repeatedly while the user moves the mobile electronic device from a bright location to a dark location, the touch panel is illuminated at the same luminance used in the bright location.

SUMMARY

A luminance control device and method are disclosed. A surrounding brightness of a touch panel is measured to obtain a measured surrounding brightness. A luminance of the touch panel is controlled during a first time period starting from when the measured surrounding brightness changes from a first condition to a second condition, during which the measured surrounding brightness decreases by an amount equal to or greater than a threshold value. The luminance of the touch panel is maintained at a first luminance corresponding to the first condition when the measured surrounding brightness changes from the second condition to the first condition. The luminance of the touch panel is controlled to change to a second luminance corresponding to the second condition, when the measured surrounding brightness has not changed from the second condition to the first condition.

In an embodiment, a mobile electronic device comprises a touch panel, an optical sensor, and a luminance control module. The optical sensor is operable to measure a surrounding brightness of the touch panel to provide a measured surrounding brightness. The luminance control module is operable to control a luminance of the touch panel during a first time period starting from when the measured surrounding brightness changes from a first condition to a second condition, during which the measured surrounding brightness decreases by an amount equal to or greater than a threshold value. The luminance control module is also operable to maintain the luminance of the touch panel at a first luminance corresponding to the first condition when the measured surrounding brightness changes from the second condition to the first condition. The luminance control module is further operable to control the luminance of the touch panel to change to a second luminance corresponding to the second condition, when the measured surrounding brightness has not changed from the second condition to the first condition.

In another embodiment, a luminance control method measures a surrounding brightness of a touch panel to obtain a measured surrounding brightness. The luminance control method further controls a luminance of the touch panel during a first time period starting from when the measured surrounding brightness changes from a first condition to a second condition, during which the measured surrounding brightness decreases by an amount equal to or greater than a threshold value. The luminance control method further maintains the luminance of the touch panel at a first luminance corresponding to the first condition when the measured surrounding brightness changes from the second condition to the first condition. The luminance control method further controls the luminance of the touch panel to change to a second luminance corresponding to the second condition, when the measured surrounding brightness has not changed from the second condition to the first condition.

In a further embodiment, a computer readable storage medium comprises computer-executable instructions for performing a method for communicating using a plurality of antennas. The method executed by the computer-executable instructions measures a surrounding brightness of a touch panel to obtain a measured surrounding brightness. The method executed by the computer-executable instructions further controls a luminance of the touch panel during a first time period starting from when the measured surrounding brightness changes from a first condition to a second condition, during which the measured surrounding brightness decreases by an amount equal to or greater than a threshold value. The method executed by the computer-executable instructions further maintains the luminance of the touch panel at a first luminance corresponding to the first condition when the measured surrounding brightness changes from the second condition to the first condition. The method executed by the computer-executable instructions further controls the luminance of the touch panel to change to a second luminance corresponding to the second condition, when the measured surrounding brightness has not changed from the second condition to the first condition.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIG. 1A is an illustration of a top view of an exemplary mobile electronic device at a bright location according to an embodiment of the disclosure.

FIG. 1B is an illustration of the top view of the exemplary mobile electronic device of FIG. 1A showing a user's finger partially covers surrounding light on a touch panel thereof.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a mobile electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), personal handy phone system (PHS), lap top computers, TV's, Global Positioning Systems (GPSs) or navigation systems, pedometers, health equipment, display monitors, or other electronic device that uses a display screen or a touch panel for displaying information.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 2:
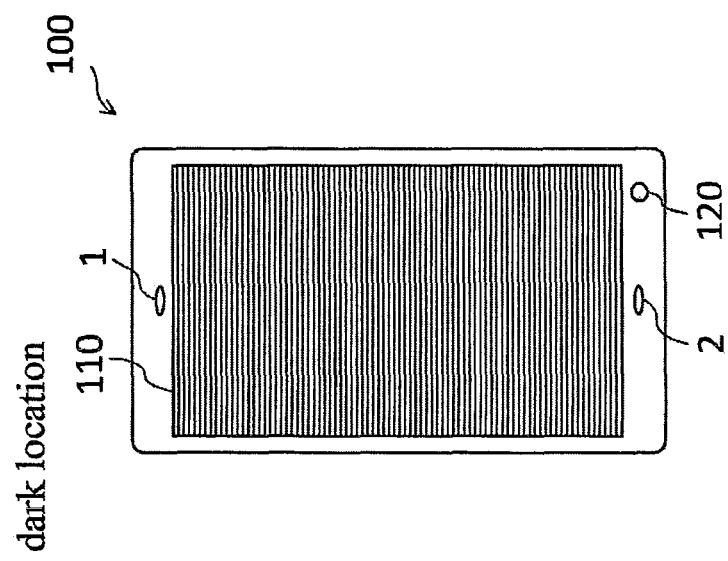
FIG. 2 is an illustration of a top view of an exemplary mobile electronic device at a dark location according to an embodiment of the disclosure.

FIG. 1A is an illustration of a top view of an exemplary mobile electronic device such as a mobile phone 100 at a bright location according to an embodiment of the disclosure. FIG. 1B is an illustration of the top view of the exemplary the mobile phone 100 of FIG. 1A showing a user's finger partially covers surrounding light on a touch panel thereof. FIG. 2 is an illustration of a top view of an exemplary mobile electronic device at a dark location according to an embodiment of the disclosure.

The mobile phone 100 may generally comprise: a speaker 1, a microphone 2, the touch panel 110, and an optical sensor 120. The mobile phone 100 may be a straight-type terminal. The mobile phone 100 is operable to control a luminance of the touch panel 110 based on an actual surrounding brightness thereof.

The touch panel 110 is operable to display objects such as icons, or other object thereon.

The optical sensor 120 is operable to measure the surrounding brightness of the touch panel 110. If the measured surrounding brightness changes between a first condition, in which the surrounding brightness is equal to or greater than a threshold value, and a second condition, in which the surrounding brightness is less than the threshold value, the mobile phone 100 changes the luminance of the touch panel 110 within a time period after the surrounding brightness changes if there are no further changes in the surrounding brightness. This is because if the user moves the mobile phone 100 from a bright location to a dark location, the surrounding brightness measured by the optical sensor 120 should stabilize in a post-change condition.

For example, when the mobile phone 100 is in a bright location, the optical sensor 120 may receive a shadow of a hand of the user due to the user operations on the touch panel 110, and the surrounding brightness measured by the optical sensor 120 is assumed to have changed from the first condition to the second condition.

If the user operations end within a prescribed time from the first condition to the second condition and the user stops the operations for example by releasing their finger from the touch panel 110, the shadow of the hand of the user disappears, and the optical sensor 120 measures the actual surrounding brightness.

If the mobile phone 100 is continuously in a bright location, the surrounding brightness measured by the optical sensor 120 changes to the first condition, and it is therefore not necessary for the mobile phone 100 to change the luminance of the touch panel 110.

On the other hand, if the mobile phone 100 is moved to a dark location, the surrounding brightness measured by the optical sensor 120 is maintained in the second condition, and the mobile phone 100 may therefore decrease the luminance of the touch panel 110.

In this manner, the mobile phone 100 may control the luminance of the touch panel 110 according to whether there is another change in brightness surrounding the touch panel 110 within the prescribed time period from a previous change in the brightness measured by the optical sensor 120. The mobile phone 100 can prevent inappropriate control of the luminance caused by the user operations on the touch panel 110, and if user operations on the touch panel 110 are being performed repeatedly, the mobile phone 100 can assure the touch panel 110 is visible when the actual surrounding brightness has decreased.

The prescribed time period is referred to as a "window time", and the luminance corresponding to the first condition is referred to as the "first luminance" and the luminance corresponding to the second condition is referred to as the "second luminance".

The mobile phone 100 controls the luminance of the touch panel 110 according to whether or not the condition of the brightness measured by the optical sensor 120 changes again within a window time to assure visibility of the display screen. For example, as a result of user operations on the touch panel 110, the brightness measured by the optical sensor 120 may differ from the actual surrounding brightness. For another example, due to light being received at the optical sensor 120, the brightness measured by the optical sensor 120 may differ from the actual surrounding brightness.

Figure 3:
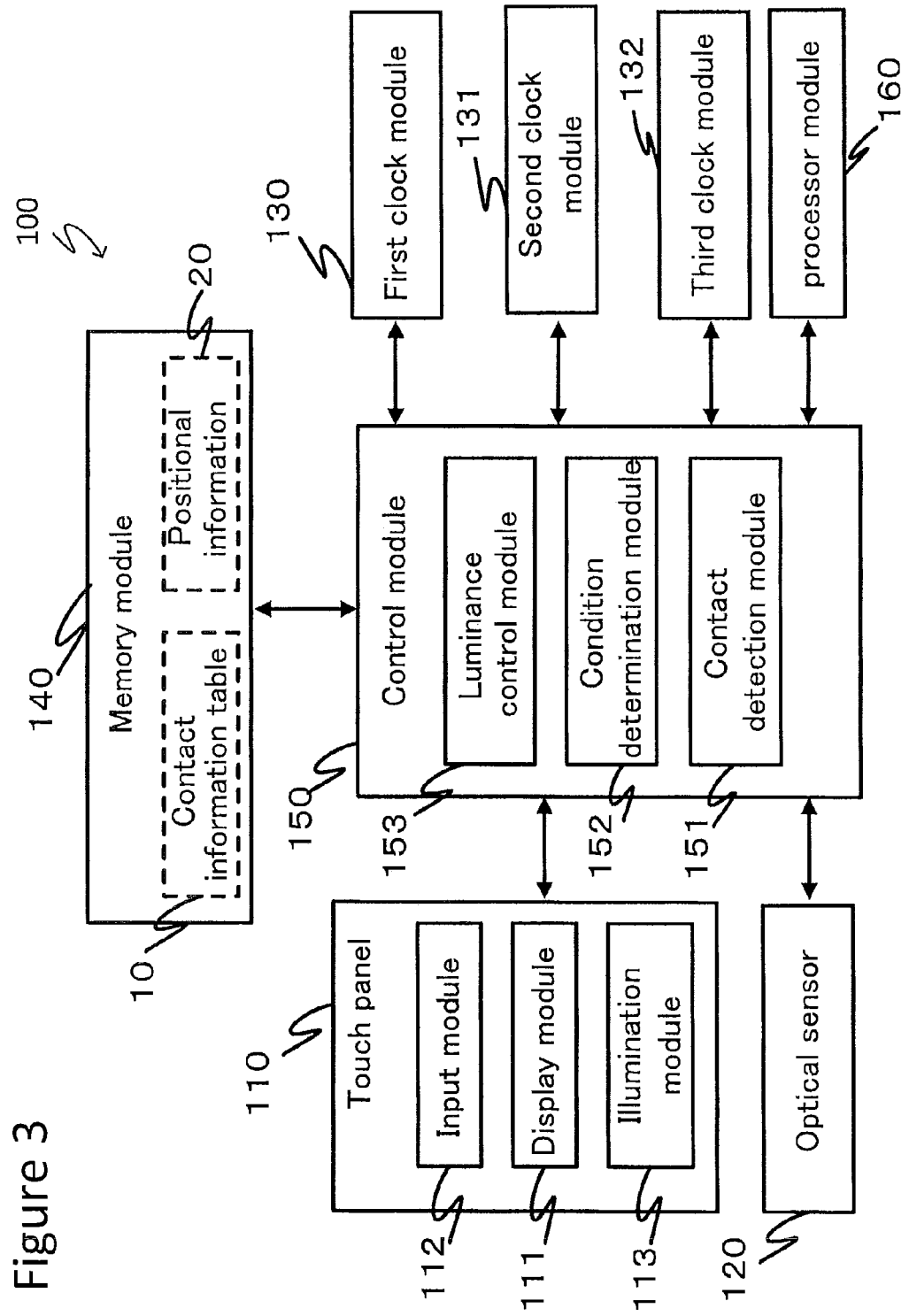
FIG. 3 is an illustration of an exemplary functional block diagram of a mobile electronic device according to an embodiment of the disclosure.

FIG. 3 is an illustration of an exemplary functional block diagram 100 (system 100) of a mobile electronic device such as the mobile phone 100 according to an embodiment of the disclosure. The mobile phone 100 comprises the touch panel 110, the optical sensor 120, a first clock module 130, a second clock module 131, a third clock module 132, a memory module 140, a control module 150, and a processor module 160.

A practical embodiment of the system 100 may comprises additional components and elements configured to support known or conventional operating features that need not be described in detail herein. The system 100 may have functions, material, and structures that are similar to the mobile phone 100 in FIG. 1. Therefore common features, functions, and elements may not be redundantly described here.

The touch panel 110 comprises a display module 111, an input module 112, and an illumination module 113.

The display module 111 comprises a Liquid Crystal Display (LCD), and receives an instruction from the control module 150 to display images of characters, icons, and other information, on the LCD. The input module 112 detects a contact made by the user. While detecting the contact made by the user, at each unit time (e.g., 25 ms), the input module 112 sends coordinate values (x, y) of a position of the contact by the user to the control module 150. The input module 112 comprises a capacitive touch sensor, or other sensor.

The coordinate values of a top left corner of the touch panel 110 in FIG. 1A are (0, 0), and the coordinate values of a bottom right corner of the touch panel 110 in FIG. 1A are (479, 799). However, other coordinate values may also be used.

A contact comprises conditions in which a body part of the user such as a finger, a touch pen, or other contact mean is in contact with the touch panel 110. A contact may also comprise conditions in which an object that changes a capacitance of the touch panel 110, such as the finger or other body part of the user, or a touch pen, approaches the touch panel 110 to a degree that changes the capacitance of the touch panel 110 to become equal to or greater than a prescribed threshold value.

The illumination module 113 is known as a backlight, and in accordance with instructions from the control module 150, it is able to light the luminance of the display module 111 to a luminance (first luminance or second luminance) instructed by the control module 150.

The optical sensor 120 detects the surrounding brightness, and can output signals of voltage levels corresponding to the detected brightness to the control module 150. The optical sensor 120 may comprise photodiodes.

The first clock module 130 starts keeping time after receiving an instruction from the control module 150. The second clock module 131 keeps the current time (e.g., in 1 ms units).

The third clock module 132 starts keeping time after receiving an instruction from the control module 150, and when the third clock module 132 keeps time for a preset time period, it notifies the control module 150. The preset time period that is kept by the third clock module 132 is abbreviated as the third time period. The third time period may be, for example, about 2 seconds, and may be set arbitrarily.

The first clock module 130, the second clock module 131, and the third clock module 132 comprise, for example, a timer and a counter.

The processor module 160 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, the processor module 160 comprise processing logic that is configured to carry out the functions, techniques, and processing tasks associated with the operation of the system 100.

In particular, the processing logic is configured to support the luminance control method described herein. Furthermore, the steps of a method or algorithm described in connection with the embodiments disclosed herein may be embodied directly in hardware, in firmware, in a software module executed by processor module 160, or in any practical combination thereof.

The memory module 140, may be realized as a non-volatile storage device (non-volatile semiconductor memory, hard disk device, optical disk device, and the like), a random access storage device (for example, SRAM, DRAM), or any other form of storage medium known in the art. The memory module 140 may be coupled to the processor module 160 respectively such that the processor module 160 can read information from, and write information to, memory module 140.

As an example, the processor module 160 and memory module 140, may reside in their respective ASICs. The memory module 140 may also be integrated into the processor module 160. In an embodiment, the memory module 140 may include a cache memory for storing temporary variables or other intermediate information during execution of instructions to be executed by processor module 160. The memory module 140 may also include non-volatile memory for storing instructions to be executed by the processor module 160.

The memory module 140 may include a database for storing the contact information table 10 and positional information 20 in accordance with an embodiment of the disclosure. The memory module 140 may also store, a computer program that is executed by the processor module 160 respectively, an operating system, an application program, tentative data used in executing a program processing, and the like.

The contact information table 10 is a table in which information composed of the time and coordinate values of when contact on the touch panel 110 is detected (hereinafter referred to as "contact information") is registered. The positional information 20 is information indicating a specific position 21 on the touch panel 110.

The specific position 21 indicates a position on the touch panel 110 that may decrease the brightness measured by the optical sensor 120 when the user attempts to operate the touch panel 110 and, for example, their finger, comes into contact.

Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Figure 4:
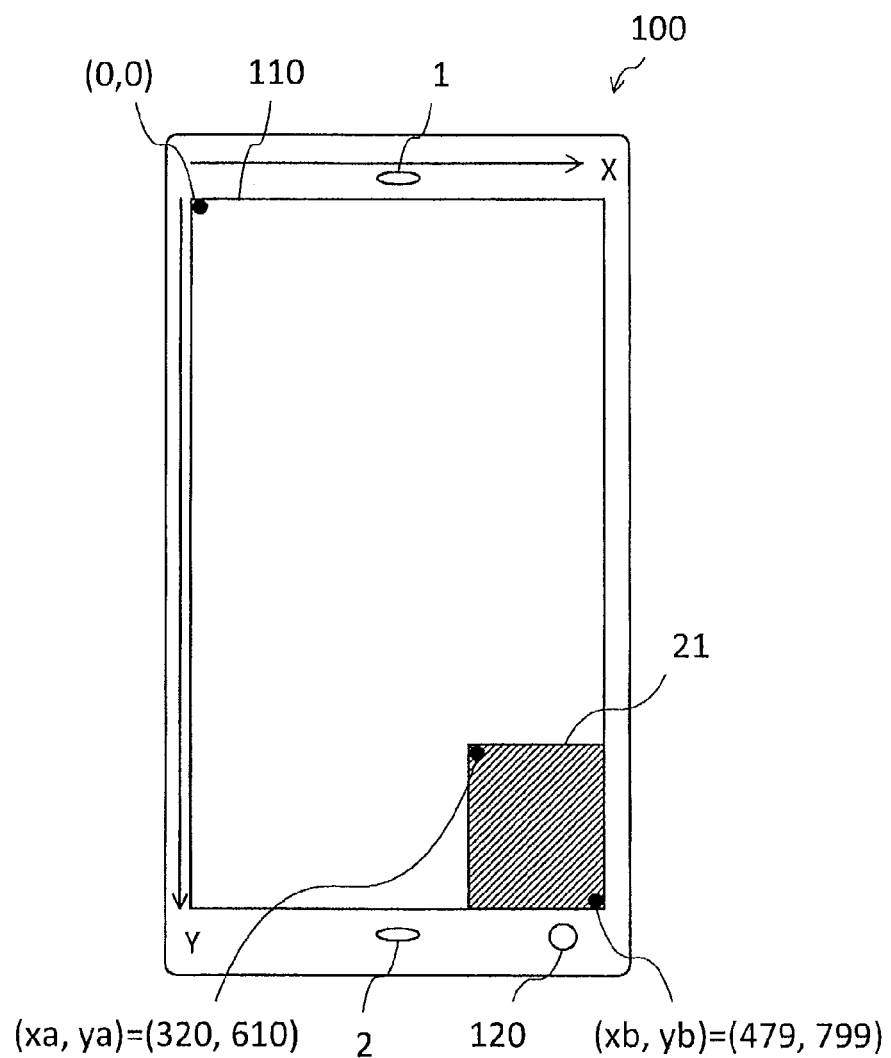
FIG. 4 is an illustration of top view of an exemplary mobile electronic device showing a position on a touch panel thereof according to an embodiment of the disclosure.

FIG. 4 is an illustration of top view of an exemplary mobile electronic device such as the mobile phone 100 showing a position on the touch panel 110 thereof according to an embodiment of the disclosure. The coordinate values (xa, ya) of the top left corner of the specific position 21 indicated by the shaded area are, for example, (320, 610), and the coordinate values (xb, yb) of the bottom right corner are, for example, (479, 799).

The positional information 20 comprises the coordinate values (xa, ya) of the top left corner of the specific position 21 indicated by the shaded area as well as the coordinate values (xb, yb) of the bottom right corner.

Other functions of the mobile phone 100 are described below in conjunction with FIG. 3.

In addition to various functions comprised in a general mobile phone that comprises display control functions, the control module 150 comprises functions that controls the luminance of the illumination module 113 of the touch panel 110 based on signals output from the optical sensor 120. The control module 150 further comprises a contact detection module 151, a condition determination module 152, and a luminance control module 153.

By receiving coordinate values from the input module 112 of the touch panel 110, the contact detection module 151 is able to detect contact by, for example, the finger of the user on the touch panel 110.

Upon receiving the coordinate values from the input module 112, the contact detection module 151 acquires the time of reception from the second clock module 131. The contact detection module 151 registers the acquired time and the received coordinate values (i.e., the contact information) in the contact information table 10 of the memory module 140.

Based on signals output from the optical sensor 120, the condition determination module 152 determines whether or not the surrounding brightness is in the first condition or the second condition.

For example, if the brightness corresponding to the signals output from the optical sensor 120 is equal to or greater than the prescribed threshold value, it is determined to be in the first condition, and if it is less than the prescribed threshold value, it is determined to be in the second condition. The prescribed threshold value is a value for distinguishing the brightness of the sunshine outdoors (e.g., about 100,000 lux) from the brightness of a normal indoor area (e.g., white fluorescent light of about 40 W) (e.g., about 500 lux), and may be a value corresponding to about "1,000 lux", for example. The prescribed value is not limited to 1,000 lux, and may be set arbitrarily.

When the determination results from the condition determination module 152 changes, the luminance control module 153 starts the timekeeping by the first clock module 130 and the third clock module 132. If the determination results from the condition determination module 152 do not change again by the time the first clock module 130 finishes keeping the window time, the luminance control module 153 also sends an instruction to the illumination module 113 of the touch panel 110 to change to the luminance corresponding to the post-change condition.

If the determination results from the condition determination module 152 change, based on the contact information table 10 and the positional information 20 of the memory module 140, the luminance control module 153 determines whether there was any contact by the, for example, finger of the user, on the specific position 21 of the touch panel 110 during a period from the second time period before the change to the third time period after the change.

The luminance control module 153 defines the default value of the window time as the first time period, and in this determination, if there has been contact, the luminance control module 153 changes the window time to a fourth time period that is longer than the first time period.

In this example, the first time period will be "about 3 seconds", the fourth time period maybe "about 5 seconds", and the second and third time periods may each be "about 2 seconds". The first time period, the second time period, the third time period, and the fourth time period are not limited to these numbers, and may be set to any appropriate number.

Figure 5:
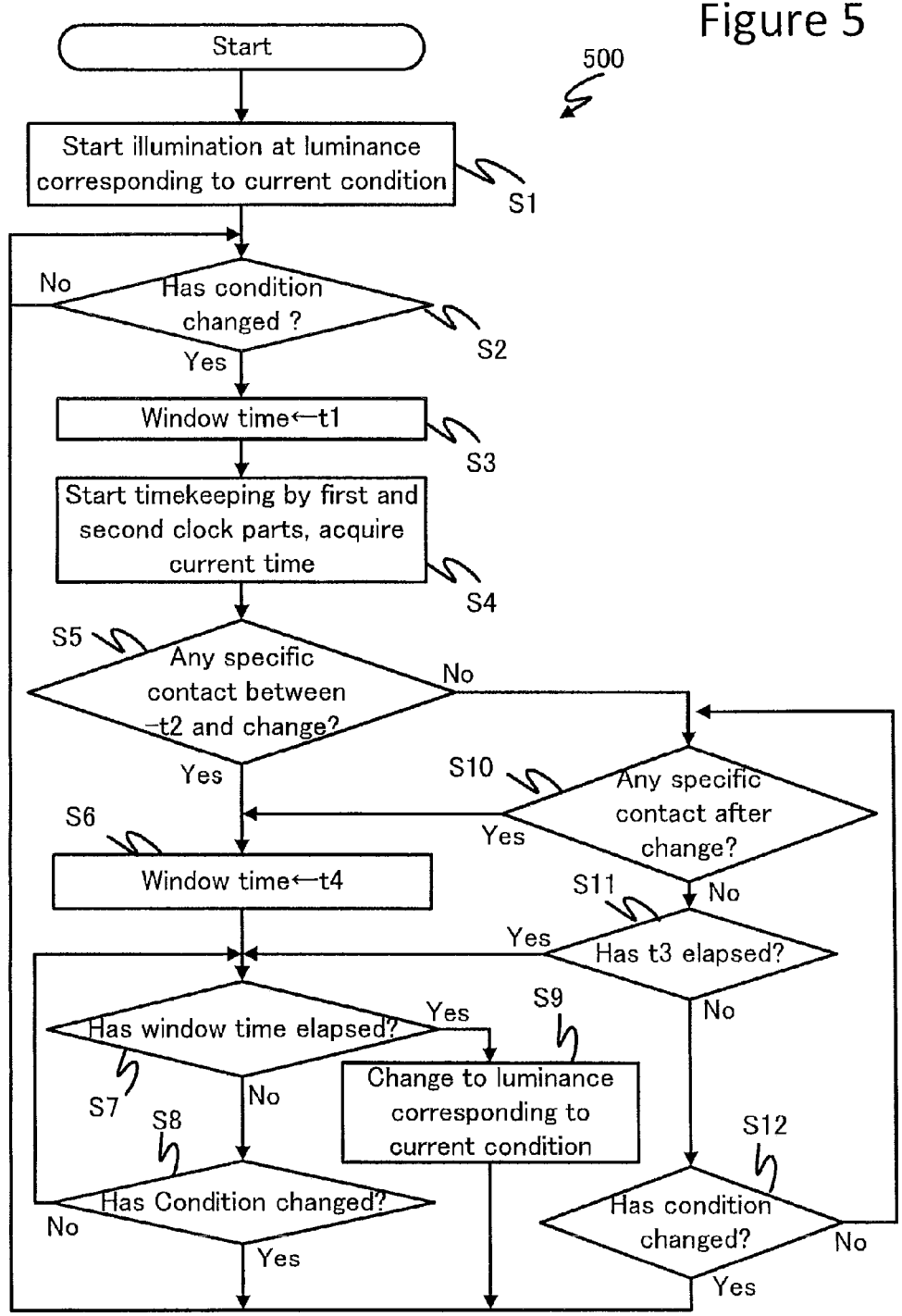
FIG. 5 is an illustration of an exemplary flowchart showing a luminance control process according to an embodiment of the disclosure.

FIG. 5 is an illustration of an exemplary flowchart showing a luminance control process 500 (process 500) that can be performed by the mobile phone 100 according to an embodiment of the disclosure. The various tasks performed in connection with the process 500 may be performed by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a computer CPU such as the processor module 160 in which the computer-readable medium is stored.

The luminance control process 500 may begin when power of the mobile phone 100 is turned ON, and may end when the power is turned OFF.

The first time period, the second time period, the third time period, and the fourth time period are noted as "t1", "t2", "t3", and "t4", respectively.

When the power of the mobile phone 100 is turned ON, the control module 150 initializes the contact information table 10 (i.e., deletes all registered contact information).

Furthermore, asynchronously from the luminance control process 500, when the contact detection module 151 detects contact by, for example, the finger of the user, on the touch panel 110, it may register contact information in the contact information table 10.

The condition determination module 152 determines whether the brightness measured by the optical sensor 120 is in either the first condition or the second condition. The luminance control module 153 specifies the luminance (first luminance or second luminance) corresponding to this determination result for the illumination module 113 of the touch panel 110. The illumination module 113 starts illumination with the specified luminance (task s1).

If the brightness measured by the optical sensor 120 is equal to or greater than the prescribed threshold value, the condition determination module 152 determines that it is in the first condition, and if it is less than the threshold value, the condition determination module 152 may determine that it is in the second condition.

The condition determination module 152 determines whether the brightness measured by the optical sensor 120 is in either the first condition or the second condition, and the luminance control module 153 determines whether the determination result has changed from the previous determination result (task s2).

If there is no change from the previous determination result (task s2: NO), the process of task s2 is repeated. If the condition has changed since the previous determination result from the first condition to the second condition or from the second condition to the first condition (task s2: YES), the luminance control module 153 sets the window time to the first time period (task s3). The luminance control module 153 starts timekeeping by the first clock module 130 and the third clock module 132 (task s4). The luminance control module 153 acquires the current time from the second clock module 131. Furthermore, if the first clock module 130 and the third clock module 132 are already keeping time, the luminance control module 153 may start timekeeping after resetting them.

Based on the contact information table 10 and the positional information 20 in the memory module 140, the luminance control module 153 determines whether there has been any contact in the specific position 21 (hereinafter referred to as "specific contact") in the period from the second time period before the time acquired from the second clock module 131 to the acquired time (task s5).

For example, if the coordinate values comprised in the contact information that comprises the times from the second time period before the acquired time to the acquired time are comprised within the rectangular area (specific position 21) identified by the top-left coordinate values (xa, ya) and bottom-right coordinate values (xb, yb) in the positional information 20, a positive determination (task s5: YES) is made.

If a positive determination is made (task s5: YES), the luminance control module 153 sets the window time to the fourth time period (task s6).

The luminance control module 153 acquires the time period being kept by the first clock module 130, and determines whether or not the window time has elapsed since the first clock module 130 started keeping time (i.e., since the determination result of the condition determination module 152 changed in task s2) (task s7).

If the window time has elapsed (task s7: YES), the luminance control module 153 specifies the luminance (first luminance or second luminance) corresponding to the most recent determination result from the condition determination module 152 for the illumination module 113 of the touch panel 110. The illumination module 113 changes to the specified luminance to perform illumination (task s9). The luminance control module 153 repeats the processes from (task s2).

If the window time has not elapsed (task s7: NO), the condition determination module 152 determines whether the brightness measured by the optical sensor 120 is in either the first condition or the second condition. The luminance control module 153 determines whether or not the determination result has changed from the previous determination result (task s8).

If there has been no change from the previous determination result (task s8: NO), the luminance control module 153 repeats the processes from task s7. If the condition has changed from the previous determination result from the first condition to the second condition or from the second condition to the first condition (task s8: YES), the luminance control module 153 repeats the processes from task s2.

In (task s5), if a negative determination is made (task s5: NO), the luminance control module 153 determines whether there has been any specific contact after the time acquired in task s4 based on the contact information table 10 and the positional information 20 in the memory module 140 (task s10).

For example, if the coordinate values comprised in the contact information that comprises the times subsequent to the time acquired in task s4 are comprised in the rectangular area (specific position 21) identified by the top-left coordinate values (xa, ya) and the bottom-right coordinate values (xb, yb) in the positional information 20, the luminance control module 153 makes a positive determination (task s10: YES).

If a positive determination is made (task s10: YES), the luminance control module 153 proceeds to the process of task s6, and if a negative determination is made (task s10: NO), it determines whether the third time period has elapsed since the third clock module 132 started keeping time (i.e., since the determination result of the condition determination module 152 changed in task s2) (task s11).

If there is a notification from the third clock module 132 that time has been kept for the third time period, the luminance control module 153 determines that the third time period has elapsed (task s11: YES) and proceeds to the process of task s7.

If there is no notification from the third clock module 132 that time has been kept for the third time period, the luminance control module 153 determines that the third time period has not elapsed (task s11: NO), and the condition determination module 152 determines whether the brightness measured by the optical sensor 120 is in either the first condition or the second condition. The luminance control module 153 determines whether the determination result of the condition determination module 152 has changed from the previous determination result (task s12).

If there has been no change in the determination result from the condition determination module 152 (task s12: NO), the luminance control module 153 repeats the processes from task s10. If the condition has changed from the previous determination result from the first condition to the second condition or from the second condition to the first condition (task s12: YES), the luminance control module 153 repeats the processes from task s2.

The operations of the mobile phone 100 described above will be described in detail using the example shown in FIG. 6.

Figure 6:
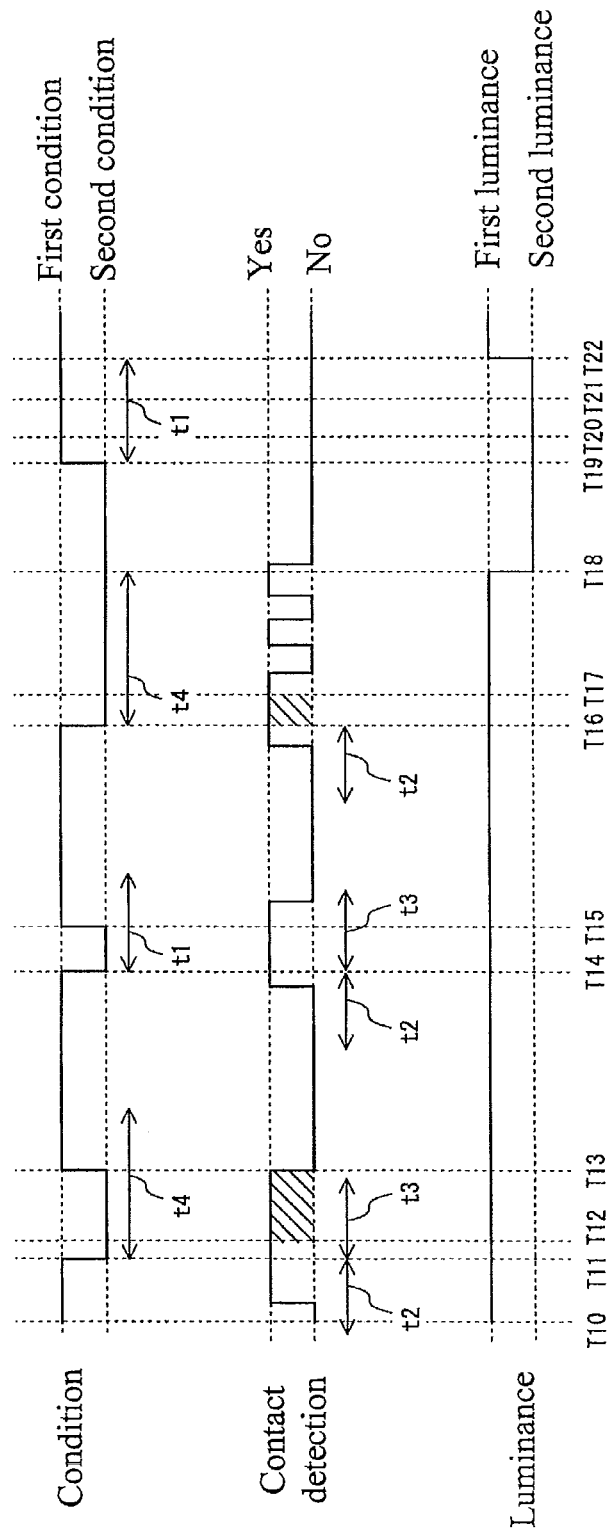
FIG. 6 is an illustration of an exemplary graph showing detection results from a contact detection module, determination results from a condition determination module, and timing of changes in luminance of a touch panel according to an embodiment of the disclosure.

FIG. 6 is an illustration of an exemplary graph showing detection results from a contact detection module 151, determination results from a condition determination module 152, and timing of changes in luminance of the touch panel 110 according to an embodiment of the disclosure.

The shaded area in the timing of the detection results from the contact detection module 151 indicates that there has been specific contact.

The time T17 indicates the time when the user possessing the mobile phone 100 moved from a bright location (e.g., sunny outdoor area) to a dark location (e.g., a normal indoor area). The time T20 indicates the time when the user possessing the mobile phone 100 moved from a dark location to a bright location.

The time T10 indicates the timing when the power of the mobile phone 100 was turned ON.

In the embodiment shown in FIG. 6, because the mobile phone 100 is in a bright location, the condition determination module 152 determines that the brightness measured by the optical sensor 120 is in the first condition. The luminance control module 153 causes the illumination module 113 to start illumination at the first luminance (task s1).

At the time T11, the brightness measured by the optical sensor 120 changes to the second condition, and the luminance control module 153 therefore determines that the determination result from the condition determination module 152 has changed from the previous determination result (first condition) (task s2: YES). The luminance control module 153 sets the window time to the first time period (task s3). The luminance control module 153 causes the first clock module 130 and the third clock module 132 to start timekeeping, and acquires the current time (time T11) from the second clock module 131 (task s4).

The luminance control module 153 determines that there was no specific contact in the period from the second time period before the acquired time T11 and the time T11 (task s5: NO). The luminance control module 153 determines whether or not there was any specific contact after the acquired time T11 (task s10).

At the time T12 that is before the third time period elapses from the acquired time T11, there is specific contact (task s10: YES). Therefore, the luminance control module 153 sets the window time to the fourth time period (task s6).

At the time T13 that is before the time period being kept by the first clock module 130 elapses the window time (t4) from the time T11, the brightness measured by the optical sensor 120 changes to the first condition. The luminance control module 153 determines that the determination result from the condition determination module 152 has changed from the previous determination result (second condition) (task s7: NO, task s8: YES).

At the time T14, the luminance control module 153 determines that the determination result from the condition determination module 152 has changed from the first condition to the second condition (task s2: YES). The luminance control module 153 sets the window time to the first time period (task s3), and resets and then starts the timekeeping by the first clock module 130 and the third clock module 132. The luminance control module 153 acquires the current time (time T14) from the second clock module 131 (task s4).

The luminance control module 153 determines that there was no specific contact in the period from the second time period before the acquired time T14 to the time T14 (task s5: NO). The luminance control module 153 determines that the determination result from the condition determination module 152 changed from the second condition to the first condition at the time T15 that is before the third time period elapses from the acquired time T14 (S12: YES).

Next, at the time T16, the luminance control module 153 determines that the determination result from the condition determination module 152 changed from the first condition to the second condition (task s2: YES). The luminance control module 153 sets the window time to the first time period (task s3). The luminance control module 153 resets and then starts the timekeeping by the first clock module 130 and the third clock module 132, and acquires the current time (time T16) from the second clock module 131 (task s4).

The luminance control module 153 determines that there was specific contact at the acquired time T16 (task s5: YES), and sets the window time to the fourth time period (task s6).

In the embodiment shown in FIG. 6, until the time T18, when the time period being kept by the first clock module 130 elapses the window time (t4) from the time T16, the brightness measured by the optical sensor 120 remains in the second condition (task s8: NO). The luminance control module 153 determines that the window time (t4) has elapsed at the time T18 (task s7: YES). Consequently, the luminance control module 153 causes the illumination module 113 to change to the luminance (second luminance) corresponding to the most recent determination result from the condition determination module 152 and perform illumination (task s9).

From the time T19 to the time T21, the sun was hitting the optical sensor 120.

At the time T19, the luminance control module 153 determines that the determination result from the condition determination module 152 changed from the second condition to the first condition (task s2: YES). The luminance control module 153 sets the window time to the first time period (task s3), and resets and then starts the timekeeping by the first clock module 130 and the third clock module 132. The luminance control module 153 acquires the current time (time T19) from the second clock module 131 (task s4).

The luminance control module 153 determines that there was no specific contact in the period from the second time period before the acquired time T19 to the time T19, and in the period from the acquired time T19 to the third time period later (task s5: NO, task s10: NO, task s11: YES).

Until the time T22, when the time period being kept by the first clock module 130 has elapsed the window time (t1) from the time T19, the brightness measured by the optical sensor 120 remains in the first condition (task s8: NO). The luminance control module 153 determines that the window time (t1) has elapsed at the time T22 (task s7: YES).

Consequently, the luminance control module 153 causes the illumination module 113 to change to the luminance (first luminance) corresponding to the most recent determination result from the condition determination module 152 and perform illumination (task s9).

As described above, even if the brightness measured by the optical sensor 120 changes to the second condition due to a user operation on the touch panel 110 in a bright location (e.g., time T11, time T14, etc. in FIG. 6), the mobile phone 100 is able to maintain the luminance of the touch panel 110 at the first luminance, and is therefore able to secure visibility.

If user operations on the touch panel 110 are being performed repeatedly, when the mobile phone 100 moves from a bright location to a dark location, it is able to change the luminance of the touch panel to the luminance corresponding to the dark location (in this example, the second luminance) (e.g., time T18, etc. in FIG. 6).

If reflected light is hitting the optical sensor 120, when the mobile phone 100 moves from a dark location to a bright location, it is able to change the luminance of the touch panel to the luminance corresponding to the bright location (first luminance) (e.g., time T22, etc. in FIG. 6).

In other words, the mobile phone 100 is able to change the luminance of the touch panel 110 to a luminance corresponding to the actual surrounding brightness, and is able to secure visibility.

The luminance control module 153 has been described as one that, in a case in which the brightness measured by the optical sensor 120 changes between the first condition and the second condition, when there is no specific contact on the touch panel 110 in the period from the second time period before the change to the third time period after the change, waits for the window time to elapse and then changes the luminance of the touch panel 110 to the luminance corresponding to the post-change condition (refer to task s5: NO, task s10: NO, task s11: YES, task s7: YES, and task s9 in FIG. 5).

The luminance control module 153 is described above as one that, in a case in which the brightness measured by the optical sensor 120 changes between the first condition and the second condition, when there is specific contact on the touch panel 110 in the period from the second time period before the change to the third time period after the change, extends the window time from the first time period to the fourth time period (refer to task s5: YES, task s10: YES, and task s6 in FIG. 5).

In the embodiment shown in FIG. 6, the luminance control module 153 does not extend the window time, and in a case in which the brightness measured by the optical sensor 120 changes between the first condition and the second condition, when there is no contact (including contact other than specific contact) on the touch panel 110 in the period from the second time period before the change to the third time period after the change, it is able to issue an instruction to change the luminance of the touch panel 110 to the luminance corresponding to the post-change condition without waiting for the window time T4 to elapse. The second embodiment will be described with a focus on modules that have been changed compared to the mobile phone 100 of the first embodiment. Items assigned the same symbol numbers and numbers as those in the first embodiment indicate functions or processes similar to those described in the first embodiment.

Figure 7:
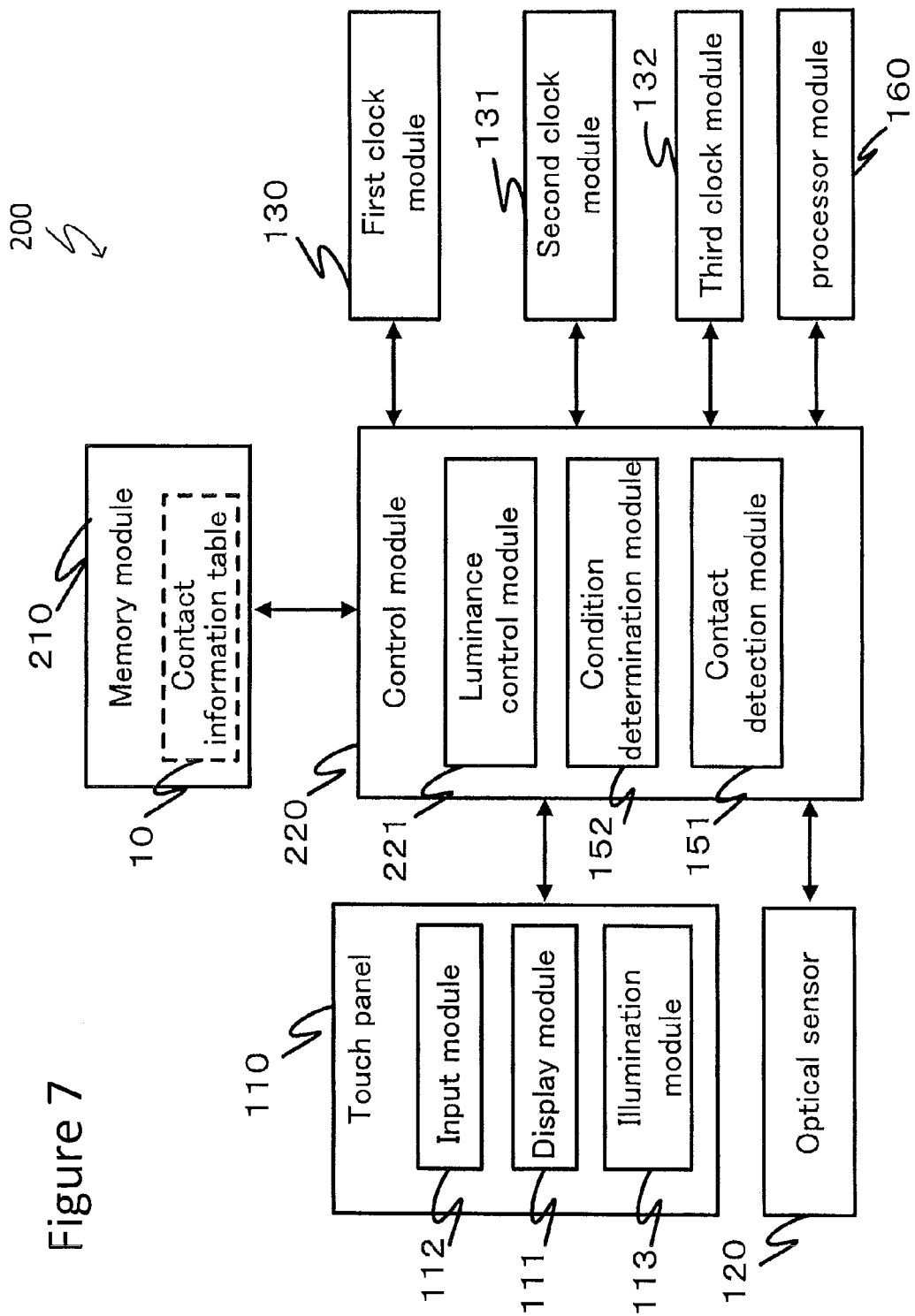
FIG. 7 is an illustration of an exemplary functional block diagram of a mobile electronic device according to an embodiment of the disclosure.

FIG. 7 is an illustration of an exemplary functional block diagram 200 (system 200) of a mobile electronic device such as a mobile phone 200 according to an embodiment of the disclosure. The system 200 may have functions, material, and structures that are similar to the system 100. Therefore common features, functions, and elements may not be redundantly described here.

The mobile phone 200 comprises the touch panel 110, the optical sensor 120, the first clock module 130, the second clock module 131, the third clock module 132, a memory module 210, and a control module 220. The mobile phone 200 differs from the mobile phone 100 in that it has the memory module 210 and the control module 220 instead of the memory module 140 and the control module 150 of the mobile phone 100.

The memory module 210 is a memory region capable of storing the contact information table 10. The memory module 210 differs from the memory module 140 in that it does not store the positional information 20.

The control module 220 comprises the contact detection module 151, the condition determination module 152, and a luminance control module 221. This differs from the control module 150 in that it has the luminance control module 221 instead of the luminance control module 153 comprised in the control module 150.

Details of the luminance control module 221 is described in more detail with reference to FIG. 8 below.

Figure 8:
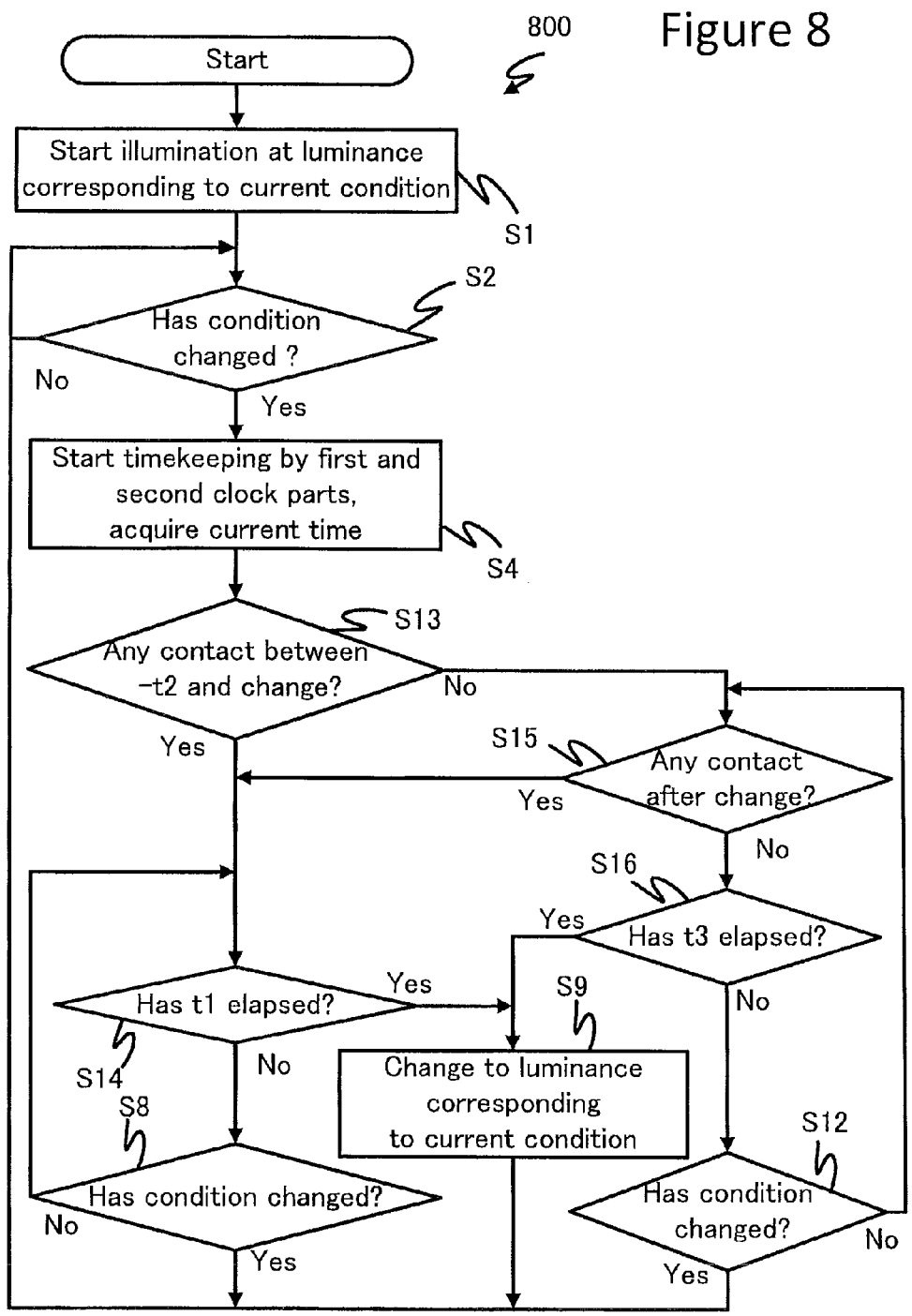
FIG. 8 is an illustration of an exemplary flowchart showing a luminance control process according to an embodiment of the disclosure.

FIG. 8 is an illustration of an exemplary flowchart showing a luminance control process 800 (process 800) that can be performed by a mobile electronic device such as the mobile phone 200 according to an embodiment of the disclosure. The various tasks performed in connection with the process 800 may be performed by software, hardware, firmware, a computer-readable medium having computer executable instructions for performing the process method, or any combination thereof. The process 800 may be recorded in a computer-readable medium such as a semiconductor memory, a magnetic disk, an optical disk, and the like, and can be accessed and executed, for example, by a computer CPU such as the processor module 160 in which the computer-readable medium is stored.

The first time period, the second time period, and the third time period are indicated as "t1", "t2", and "t3", respectively.

As with the mobile phone 100, when the power of the mobile phone 200 is turned ON, the processes of task s1, task s2, and task s4 are performed. In other words, the control module 220 performs an initialization process of the contact information table 10. The luminance control module 221 performs a start process for illumination at the luminance corresponding to the determination result from the condition determination module 152, as well as a determination process regarding whether the determination result from the condition determination module 152 has changed (task s1, task s2). If the determination result from the condition determination module 152 has changed (task s2: YES), the luminance control module 221 performs a clock starting process and an acquisition process for the current time (task s4).

Based on the contact information table 10 in the memory module 210, the luminance control module 221 determines whether or not there has been contact on the touch panel 110 in the period from the second time period before the acquired time to the acquired time (task 13). If there is contact information including a time from the period from the second time period before the acquired time to the acquired time, the luminance control module 221 makes a positive determination (task s13: YES). The luminance control module 221 acquires the time period being kept by the first clock module 130, and determines whether or not the first time period has elapsed (task s14).

If the first time period has elapsed (task s14: YES), the luminance control module 221 performs a process to change the illumination to the luminance corresponding to the most recent determination result from the condition determination module 152 (task s9). The luminance control module 221 repeats the processes from task s2.

If the first time period has not elapsed (task s14: NO), as with the mobile phone 100, the luminance control module 221 performs a determination process regarding whether the determination result from the condition determination module 152 has changed (task s8).

On the other hand, in task s13, if there is no contact information including a time from the period from the second time period before the time acquired by the luminance control module 221 to the acquired time, the luminance control module 221 makes a negative determination (task s13: NO). Based on the contact information table 10 in the memory module 210, the luminance control module 221 determines whether or not there was contact on the touch panel 110 subsequent to the time acquired in task s4 (task s15).

If there is contact information including a time subsequent to the time acquired in task s4, the luminance control module 221 makes a positive determination (task s15: YES). The luminance control module 221 proceeds to the process of (task s14).

If there is no contact information including a time subsequent to the time acquired in task s4, the luminance control module 221 makes a negative determination (task s15: NO). The luminance control module 221 determines whether or not the third time period has elapsed (task s16).

If there has been a notification from the third clock module 132 that the third time period has been kept, the luminance control module 221 determines that the third time period has elapsed (task s16: YES) and proceeds to the process of (task s9).

If there has been no notification from the third clock module 132 that the third time period has been kept, the luminance control module 221 determines that the third time period has not elapsed (task s16: NO). The luminance control module 221 performs a determination process regarding whether the determination result from the condition determination module 152 has changed (task s12).

In the above, the mobile electronic device of the present invention has been described based on the first embodiment and the second embodiment, but it is possible to make modifications such as the following, and of course, the present invention is not limited to a mobile phone such as those described in the first embodiment and the second embodiment.

The mobile phone 200 has been described as differing from the mobile phone 100 in that: (a) it does not extend the window time; (b) it is not limited to specific contact; and (c) it changes the luminance of the touch panel 110 to the luminance corresponding to the post-change condition without waiting for the window time to elapse.

However, the mobile phone 200 may be a mobile phone in which at least 1 of the above points (a) through (c) has been applied to the mobile phone 100. For example, the mobile phone 200 may be a mobile phone in which only the item (a) has been applied from among the items (a) through (c).

The second embodiment has been described as one in which, if the brightness measured by the optical sensor 120 changes between the first condition and the second condition, the luminance of the touch panel 110 is controlled based on whether or not there was contact on the touch panel 110 in all periods from the second time period before the change to the third time period after the change. However, the luminance of the touch panel 110 may be controlled based on whether or not there was contact in either the period from the second time period before the change to the change, or the period from the change to the third time period after the change.

The first embodiment has been described as one in which, if the brightness measured by the optical sensor 120 changes between the first condition and the second condition, when there is specific contact on the touch panel 110 in the period between the second time period before the change to the third time period after the change, the luminance control module 153 extends the window time.

However, without being limited to all periods from the second time period before the change to the third time period after the change, the luminance control module 153 may extend the window time based on whether or not there was specific contact in either the period from the second time period before the change to the change, or the period from the change to the third time period after the change. For example, the luminance control module 153 may determine whether to extend the window time based on whether or not there was specific contact in the period from the second time period before the change to the change, from among all periods from the second time period before the change to the third time period after the change.

In the first embodiment and the second embodiment, the brightness measured by the optical sensor has been described as having the two conditions of the first condition and the second condition, but it may have three or more conditions.

In this case, if the number of conditions is defined as n (n being a natural number that is 3 or greater), (n−1) number of threshold values is required. For example, if the number of conditions n is 3, 2 threshold values are required. For example, a second threshold value (e.g., a value corresponding to "5,000 lux") that is greater than the prescribed threshold value described in the embodiments and variations (e.g., a value corresponding to "1,000 lux"; described as the "first threshold value" in this section) is determined, and the conditions in which the brightness measured by the optical sensor 120 is equal to or greater than the second threshold value, less than the second threshold value and equal to or greater than the first threshold value, and less than the first threshold value may be defined as the third condition, the first condition, and the second condition, respectively.

In the following, operations of a mobile phone 300 in a case in which there is the third condition in addition to the first and second conditions are described.

Figure 9:
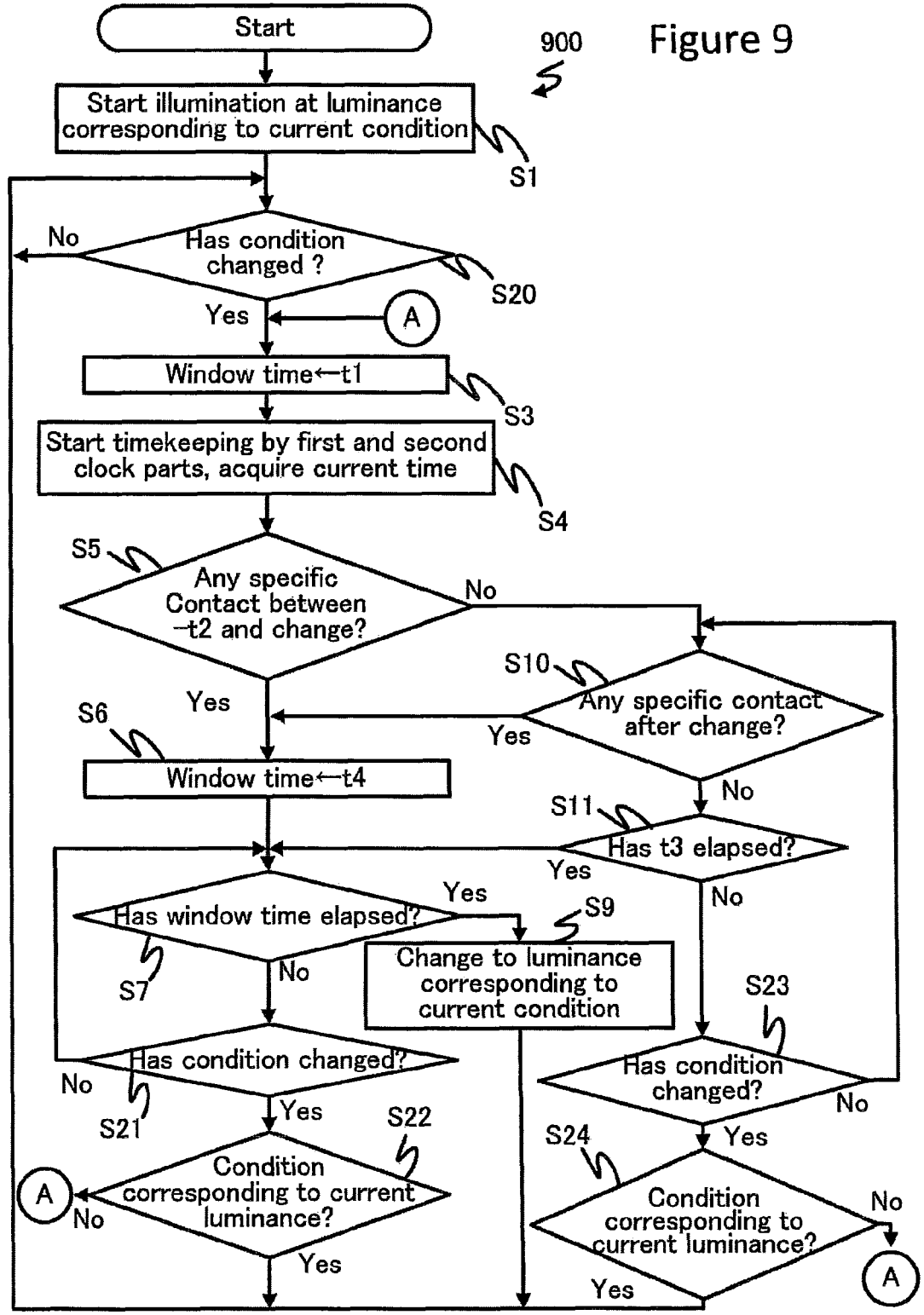
FIG. 9 is an illustration of an exemplary flowchart showing a luminance control process according to an embodiment of the disclosure.
Figure 10:
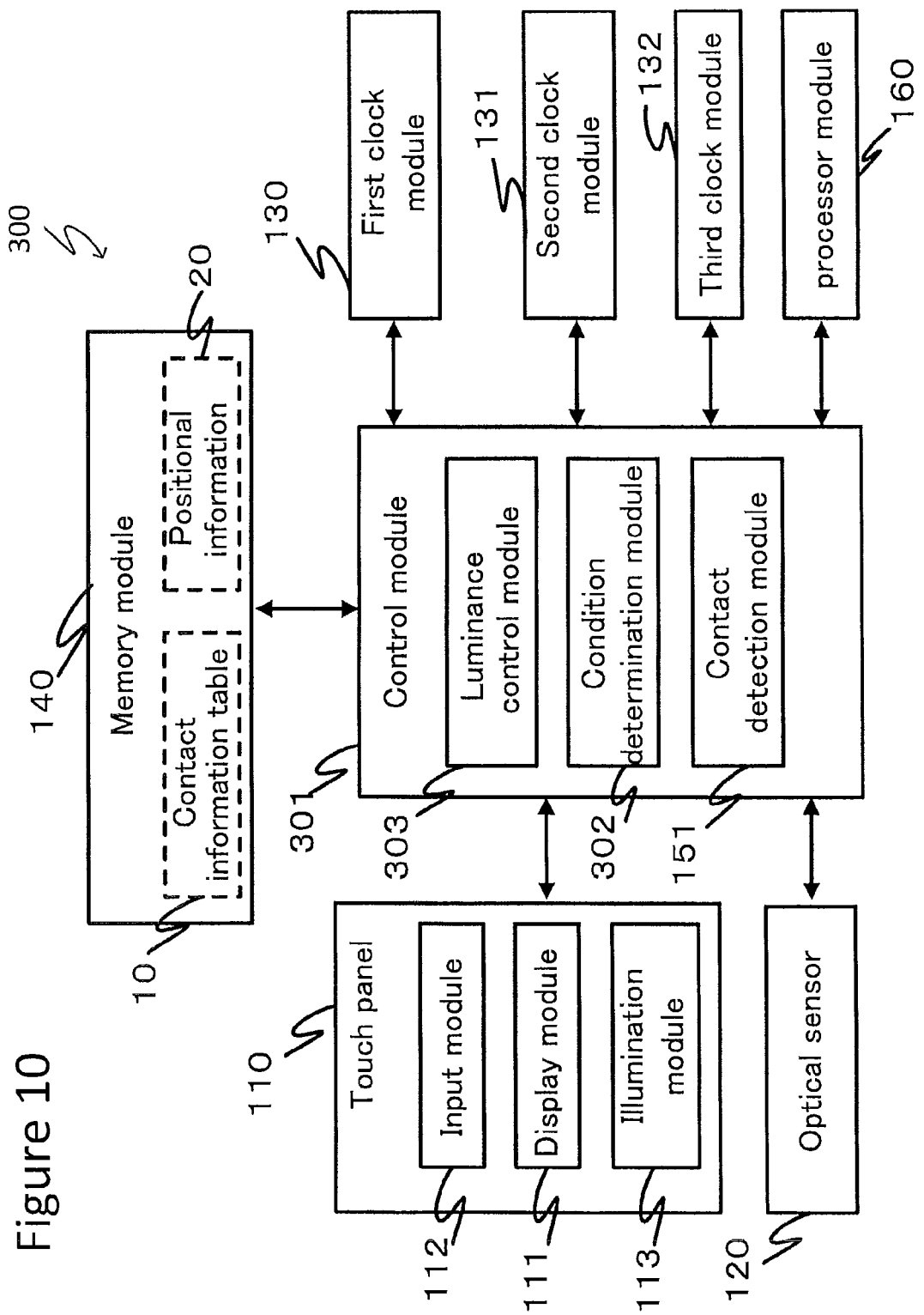
FIG. 10 is an illustration of an exemplary functional block diagram of a mobile electronic device according to an embodiment of the disclosure.

FIG. 9 is an illustration of an exemplary flowchart showing a luminance control process 900 (process 900) that can be performed by a mobile phone 300 according to an embodiment of the disclosure. FIG. 10 is an illustration of an exemplary functional block diagram of the mobile phone 300 according to an embodiment of the disclosure.

The various tasks performed in connection with the process 900 may be performed by software, hardware, firmware, a computer-readable medium having computer executable instructions for performing the process method, or any combination thereof. The process 900 may be recorded in a computer-readable medium such as a semiconductor memory, a magnetic disk, an optical disk, and the like, and can be accessed and executed, for example, by a computer CPU such as the processor module 160 in which the computer-readable medium is stored.

The luminance control process of the mobile phone 300 differs in that, instead of the processes of (task s2, task s8, and task s12) of the luminance control process of the mobile phone 100 (refer to FIG. 5), it comprises the processes of (task s20), (task s21), and (task s23), and has added the processes of (task s22) and (task s24).

Consequently, in the following, the luminance control process of the mobile phone 300 will be described with a focus on these areas of difference. Furthermore, the mobile phone 300 may have the functions of the mobile phone 100 and the mobile phone 200. For example, the control module 301 described later may have the functions of the control module 150 or the control module 220. In FIG. 9 and FIG. 10, items assigned the same symbol numbers and numbers as those in the first embodiment or the second embodiment indicate functions or processes similar to those described in the first embodiment or the second embodiment.

As with the mobile phone 100, when the power of the mobile phone is turned ON, the control module 301 of the mobile phone 300 performs an initialization process of the contact information table 10. The condition determination module 302 determines whether the brightness measured by the optical sensor 120 is in the first state, the second state, or the third state. The luminance control module 303 specifies the luminance corresponding to the determination result (first luminance, second luminance, or third luminance) for the illumination module 113 of the touch panel 110, and the illumination module 113 starts illumination with the specified luminance (task s1).

Next, the luminance control module 303 performs a determination process regarding whether the determination result from the condition determination module 302 has changed (task s20).

If there has been a change from the first condition to either the second or third condition, or from the second condition to either the first or third condition, or from the third condition to either the first or second condition (task s20: YES), as with the luminance control module 153, the luminance control module 303 performs a setting process for the window time, a start process for timekeeping, and an acquisition process for the current time (task s3, task s4).

Next, as with the luminance control module 153, the luminance control module 303 performs a determination process regarding whether or not there was contact on the touch panel 110 in the period from the second time period before the acquired time to the acquired time (task s5). If there was contact (task s5: YES), the luminance control module 303 performs a resetting process for the window time and a determination process regarding whether or not the window time has elapsed (task s6, task s7).

If the window time has elapsed (task s7: YES), as with the luminance control module 153, the luminance control module 303 specifies the luminance corresponding to the most recent determination result from the condition determination module 302 (first luminance, second luminance, or third luminance) for the illumination module 113 of the touch panel 110. The illumination module 113 changes to the specified luminance and performs illumination (task s9), and the processes from task s20 are repeated.

If the window time has not elapsed (task s7: NO), as with the luminance control module 153, the luminance control module 303 performs a determination process regarding whether the determination result from the condition determination module 302 has changed (task s21). If the determination result has changed (task s21: YES), the luminance control module 303 determines whether or not the post-change condition is the condition corresponding to the current luminance (task s22).

For example, the luminance control module 303 makes a positive determination (task s22: YES) if, when the current luminance is the first luminance, the post-change condition is the first condition, or if, when the current luminance is the second luminance, the post-change condition is the second condition, or if, when the current luminance is the third luminance, the post-change condition is the third condition.

If a positive determination is made (task s22: YES), the processes from (task s20) are performed, and if a negative determination is made (task s22: NO), the processes from (task s3) are performed.

On the other hand, in (task s5), if there was no contact on the touch panel 110 in the period from the second time period before the acquired time to the acquired time (task s5: NO), as with the luminance control module 153, the luminance control module 303 performs a determination process regarding whether or not there was contact on the touch panel 110 subsequent to the time acquired in (task s4, task s10).

If there was contact (task s10: YES), the luminance control module 303 proceeds to the process of task s6. If there was no contact (task s10: NO), as with the luminance control module 153, the luminance control module 303 performs a determination process regarding whether or not the third time period has elapsed (task s11).

As with the luminance control module 153, if the third time period has elapsed (task s11: YES), the luminance control module 303 proceeds to the process of (task s7). If the third time period has not elapsed (task s11: NO), the luminance control module 303 performs a determination process regarding whether the determination result from the condition determination module 302 has changed (task s23).

If the determination result has changed (task s23: YES), as with the process of (task s22), a determination is made as to whether or not the post-change condition is the condition corresponding to the current luminance (task s24).

If a positive determination is made (task s24: YES), the processes from (task s20) are performed, and if a negative determination is made (task s24: NO), the processes from (task s3) are performed.

Furthermore, in FIG. 5 and FIG. 8, it is described that if the condition changed in task s8 (task s8: YES) or if the condition changed in task s12 (task s12: YES), the luminance control module 303 repeats the processes from (task s2), but it may perform the processes from task s3.

However, in this case, in the process of task s9, if the post-change luminance matches the current luminance, the luminance control module 303 may maintain the current luminance and make no change.

In the above description, the process of task s22 is performed if the condition has changed in (task s21) (task s21: YES), and the process of task s24 is performed if the condition has changed in task s23 (task s23: YES), but if the condition has changed in (task s21) (task s21: YES) or if the condition has changed in task s23 (task s23: YES), the processes from task s3 may be performed without performing the processes of (task s22) or (task s24).

In this case, in the process of task s9, if the post-change luminance matches the current luminance, the luminance control module 303 may maintain the current luminance and make no changes.

The above has been a description on the luminance control process of the mobile phone 300.

In the descriptions of the first embodiment and the second embodiment, if the brightness measured by the optical sensor 120 changes from being equal to or greater than a prescribed threshold value (e.g., a value corresponding to "1,000 lux") to being less than that threshold value, the condition determination module determines that it has changed from the first condition to the second condition, and if the brightness measured by the optical sensor 120 changes from being less than the threshold value to being equal to or greater than the threshold value, the condition determination module determines that it has changed from the second condition to the first condition.

However, if the amount of decrease within a unit time in the brightness measured by the optical sensor 120 changes from being less than the prescribed threshold value (e.g., a value corresponding to "1,000 lux") to being equal to or greater than the threshold value, the condition determination module may determine that it has changed from the first condition to the second condition. If the amount of increase within a unit time in the brightness measured by the optical sensor 120 changes from being less than the threshold value to being equal to or greater than the threshold value, the condition determination module may determine that it has changed from the second condition to the first condition.

The prescribed threshold value (e.g., a value corresponding to "1,000 lux") shown in the first embodiment and the second embodiment is one example and may be another value, and it may be, for example, set by the user to any value.

In the first embodiment and the second embodiment, the first time period is described as "about 3 seconds", the second and third time period are described as "about 2 seconds", and the fourth time period is described as "about 5 seconds", but these are examples, and each time period may be determined to meet the conditions of "the fourth time period>the first time period>the second and first time periods>the third time period". Alternatively, the first time period, the second time period, the third time period, and the fourth time period may be set by the user to meet the conditions of "the fourth time period>the first time period>the second and first time periods>the third time period".

The second time period and the third time period may be identical time periods or different time periods.

In the first embodiment and the second embodiment, the optical sensor 120 is described as being arranged on the lower module (near the microphone 2) of the touch panel 110, but the arrangement of the optical sensor 120 may be changed appropriately. However, because the optical sensor 120 is used to change the luminance of the touch panel 110 according to the actual surrounding brightness, it is preferably arranged near the touch panel 110.

Furthermore, if the arrangement of the optical sensor 120 is changed, the specific position 21 indicated by the positional information 20 may be changed to match that arrangement.

In the first embodiment and the second embodiment, the specific position 21 indicated by the positional information 20 is described as being a rectangular area, and the positional information 20 is described as being set in advance. However, at the start of operation of the mobile phone of the first embodiment and the second embodiment, for example, it is possible to have the user perform operations on the touch panel 110 multiple times, identify a position on the touch panel 110 where the brightness measured by the optical sensor 120 decreases by a prescribed threshold value or more, and store the identified position as the positional information 20 in the memory module 140.

This positional information 20 may be a rectangular area determined in a way to comprise the identified position, or may be a group of 1 or more coordinate values indicating the identified position.

The mobile phone of the first embodiment and the second embodiment has been described as being a straight-type mobile phone, but it may be a mobile phone with another external appearance, such as a folding-type or sliding-type mobile phone.

In a folding-type or sliding-type mobile phone, the chassis on which the touch panel 110 is arranged and the chassis on which the optical sensor 120 is arranged may be the same chassis or different chasses.

The mobile phone of the first embodiment and the second embodiment have been described as including one set of the display module 111 and the illumination module 113, but it may further comprise one or more sets of display modules and illumination modules. The illumination by each illumination module may be controlled in a manner similar to that described in the first embodiment and the second embodiment.

The one or more sets of display modules and illumination modules added in this variation may configure the touch panel.

The input module of the touch panel 110 of the first embodiment and the second embodiment has been described as being realized by a capacitive touch sensor, but for the capacitive touch sensor, any appropriate type may be used, such as: a projection-type that forms multiple electrode patterns on a substrate of plastic or glass, etc. and makes distinctions by measuring the ratios of the amount of current from multiple electrode patterns near a contact point; or a surface-type that is configured to comprise a conducting layer and a substrate, provides electrodes on the corners of the substrate, forms an even electric field created by the conducting layer, and distinguishes contact positions by measuring the ratios of the amount of current from the electrodes on the corners caused by contact by a finger, etc.

The input module of the touch panel 110 is not limited to being realized by a capacitive touch sensor, and may be realized by, for example: an electromagnetic induction system using a specialized pen, such as an electronic pen; a matrix switch system composed of a two-layer structure of transparent electrodes; a resistive film system that applies a voltage to one of two resistive films and detects a voltage corresponding to the operated position on the other resistive film; a surface acoustic wave system that detects the bouncing back of oscillating waves through voltage changes in piezoelectric elements and detects contact by a finger, etc.; an infrared system that detects a position touched by a finger, etc. based on infrared rays that have been shielded; or an optical sensor system that builds in optical sensors into a screen and detects contact positions.

In various embodiments, the shape of the LCD of the display module of the touch panel 110 is described as a roughly rectangular shape, but it may be, for example, a circular shape or another polygonal shape.

For the various components described in the first embodiment and the second embodiment, the functions thereof may be realized through cooperation with a processor comprised in the mobile phone.

A program for causing the processor to execute the luminance control processes described in the first embodiment and the second embodiment (refer to FIG. 5 and FIG. 8) may be stored in a storage medium and circulated and distributed via various communication paths, etc. Examples of this storage medium comprise an IC card, a hard disk, an optical disk, a flexible disk, a ROM, or a flash memory, etc. The circulated and distributed program is provided for use by being stored in a memory, etc. that is readable by the processor in the equipment, and the various functions of the mobile phone described in the first embodiment and the second embodiment are realized when the processor executes this program.

Part or all of the details of the present disclosure may be combined and applied to the mobile phone 100, the mobile phone 200, and the mobile phone 300, with no distinction between the first embodiment and the second embodiment.

In the following, the configuration of a mobile electronic device according to an illustrative embodiment of the present invention will be described, as will variations thereof and the respective effects of each.

(a) The mobile electronic device according to this illustrative embodiment of the present embodiment is a mobile electronic device including functions for adjusting the luminance of a touch panel according to the surrounding brightness, and comprises: an optical sensor that is arranged near the touch panel and measures the surrounding brightness; and a luminance control module that, if the brightness measured by the optical sensor changes from a first condition to a second condition, in which it decreases by an amount equal to or greater than a threshold value for controlling and changing the luminance of the touch panel, maintains the luminance of the touch panel at a luminance corresponding to the first condition if, by the time a first time period elapses from the change, the brightness measured by the optical sensor changes from the second condition to the first condition, or controls the luminance of the touch panel to change to a luminance corresponding to the second condition if, by the time the first time period elapses from the change, the brightness measured by the optical sensor has not changed from the second condition to the first condition.

Generally, a single user operation on the touch panel (e.g., operations such as a click, a double-click, or a drag) often ends within a relatively short time period.

Consequently, if the optical sensor enters the shadow of the hand of the user due to a user operation on the touch panel and the brightness measured by the optical sensor changes from the first condition to the second condition, the optical sensor is likely to return to measuring the actual surrounding brightness within a relatively short time period after the change.

Therefore, if the brightness measured by the optical sensor changes from the first condition to the second condition due to a user operation on the touch panel, when there is no change in the actual surrounding brightness, the brightness measured by the optical sensor returns to the first condition, and when the actual surrounding brightness has decreased, the brightness measured by the optical sensor is maintained in the second condition.

In a case in which the brightness measured by the optical sensor changes from the first condition to the second condition, when the brightness measured by the optical sensor returns to the first condition within a first time period from the change, the mobile electronic device maintains the luminance of the touch panel at the luminance corresponding to the first condition, and when the brightness measured by the optical sensor is maintained in the second condition throughout the first time period from the change, the mobile electronic device changes the luminance of the touch panel to the luminance corresponding to the second condition.

Consequently, by using an appropriate first time period, according to this mobile electronic device, it is possible to prevent cases of inappropriate control of the luminance of the display screen caused by user operations on the touch panel, and to secure visibility of the display screen if the actual surrounding brightness changes during the user operation on the touch panel.

(b) If the brightness measured by the optical sensor has changed from the first condition to the second condition, when there is no contact on the touch panel in the period from the second time period before the change to the change, the luminance control module may change the luminance of the touch panel to the luminance corresponding to the second condition without performing the control.

If there is no contact on the touch panel in the period from the second time period before the brightness measured by the optical sensor changes to the second condition to the change, the cause of the change is likely to be a decrease in the actual surrounding brightness.

According to this mobile electronic device, in addition to enjoying the above effects of (a), if there is a high likelihood that the actual surrounding brightness has decreased, it is possible to immediately change the luminance of the touch panel to the luminance corresponding to the second condition and secure visibility without waiting for the first time period to elapse from the change to the second condition.

(c) If the brightness measured by the optical sensor changes from the first condition to the second condition and there is no contact on the touch panel in the period from the second time period before the change to the change, and only if there has been no contact on the touch panel by the end of a third time period that is no longer than the first time period from the change, the luminance control module may change the luminance of the touch panel to the luminance corresponding to the second condition.

If there has been no contact on the touch panel in the periods before and after the brightness measured by the optical sensor changes to the second condition, the cause of the change is very likely to be a decrease in the actual surrounding brightness.

According to this mobile electronic device, in addition to enjoying the above effects of (a), if there is a very high likelihood that the actual surrounding brightness has decreased, it is possible to change the luminance of the touch panel to the luminance corresponding to the second condition and secure visibility once the third time period that is shorter than the first time period elapses, without waiting for the first time period to elapse from the change to the second condition.

(d) The optical sensor is arranged on approximately the same plane as the display surface of the touch panel, and the mobile electronic device further comprises a memory module that stores positional information indicating a position on the touch panel where the brightness measured by the optical sensor may decrease due to contact. If the brightness measured by the optical sensor changes from the first condition to the second condition, when there has been contact on the position on the touch panel indicated by the positional information in the period from the second time period before the change to the change, the luminance control module changes the first time period to a longer time period and performs the control, and when there has been no contact on the position on the touch panel indicated by the positional information, the luminance control module may change the luminance of the touch panel to the luminance corresponding to the second condition without performing the control.

In the period from the second time period before the brightness measured by the optical sensor changes to the change, if there is no contact on a position on the touch panel, that may decrease the brightness measured by the optical sensor, the cause of the change is likely to be a decrease in the actual surrounding brightness.

According to this mobile electronic device, in addition to enjoying the above effects of (a), if there is a high likelihood that the actual surrounding brightness has decreased, it is possible to immediately change the luminance of the touch panel to the luminance corresponding to the second condition and secure visibility without waiting for the first time period to elapse from the change to the second condition.

(e) The mobile electronic device may further comprise a condition determination module that: if the brightness measured by the optical sensor changes from being equal to or greater than the threshold value to being less than the threshold value, determines that it has changed from the first condition to the second condition; and if the brightness measured by the optical sensor changes from being less than the threshold value to being equal to or greater than the threshold value, determines that it has changed from the second condition to the first condition.

According to an embodiment, because it is possible to determine whether or not the brightness measured by the optical sensor has changed between the first condition and the second condition by simply setting a threshold value, implementation is easy.

(f) The mobile electronic device may further comprise a condition determination module that: if the amount of decrease within a unit time in the brightness measured by the optical sensor changes from being less than the threshold value to being equal to or greater than the threshold value, determines that it has changed from the first condition to the second condition; and if the amount of increase within a unit time in the brightness measured by the optical sensor changes from being less than the threshold value to being equal to or greater than the threshold value, determines that it has changed from the second condition to the first condition.

According to an embodiment, if the amount of change (amount of decrease or increase) within a unit time in the brightness measured by the optical sensor changes by an amount equal to or greater than the threshold value, it is determined that the brightness measured by the optical sensor has changed between the first condition and the second condition.

Consequently, according to this mobile electronic device, it is possible to change the luminance of the touch panel according to the actual brightness without setting an absolute value of the brightness measured by the optical sensor as the threshold value.

(g) Furthermore, in a case in which the brightness measured by the optical sensor changes from the second condition to the first condition, if the brightness measured by the optical sensor changes from the first condition to the second condition by the time the first time period elapses from the change, the luminance control module may maintain the luminance of the touch panel at the luminance corresponding to the second condition, and if there is no change from the first condition to the second condition, the luminance control module may control the luminance of the touch panel to change to the luminance corresponding to the first condition.

In a case in which the brightness measured by the optical sensor has changed from the second condition to the first condition, if the brightness measured by the optical sensor returns to the second condition within the first time period from the change, the mobile electronic device maintains the luminance of the touch panel at the luminance corresponding to the second condition, and if the brightness measured by the optical sensor is maintained in the first condition throughout the first time period from the change, the mobile electronic device changes the luminance of the touch panel to a luminance corresponding to the first condition.

Consequently, by using an appropriate first time period, according to this mobile electronic device, it is possible to prevent cases of inappropriate control of the luminance of the display screen caused by reflected light, etc. hitting the optical sensor, and to secure visibility of the display screen if the actual surrounding brightness becomes high while the reflected light, etc. is hitting the optical sensor.

The luminance control method of the mobile electronic device may be realized by the mobile phone described in, for example, the first embodiment or the second embodiment (in particular, refer to the procedures of the luminance control processes described with reference to FIG. 5 and FIG. 8).

In this document, the terms "computer program product", "computer-readable medium", and the like may be used generally to refer to media such as, for example, memory, storage devices, or storage unit. These and other forms of computer-readable media may be involved in storing one or more instructions for use by the processor module 160 and/or the control module 150/220/301 to cause the processor module 160 and/or the control module 150/220/301 to perform specified operations. Such instructions, generally referred to as "computer program code" or "program code" (which may be grouped in the form of computer programs or other groupings), when executed, enable a method of using a system.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device comprising:
   a touch panel;
   an optical sensor operable to measure a surrounding brightness of the touch panel to provide a measured surrounding brightness; and
   a luminance control module operable to:
      maintain a luminance of the touch panel during a predetermined first time period starting when the measured surrounding brightness changes from a first condition to a second condition, during which the measured surrounding brightness decreases by an amount equal to or greater than a threshold value;
      maintain the luminance of the touch panel at a first luminance corresponding to the first condition when the measured surrounding brightness changes from the second condition to the first condition during the first time period;
      adjust the luminance of the touch panel to change to a second luminance corresponding to the second condition when the measured surrounding brightness has not changed from the second condition to the first condition during the first time period; and
      adjust the luminance of the touch panel to change to the second luminance corresponding to the second condition when there is no contact on the touch panel during a third time period corresponding to an initial portion of the first time period.

2. The mobile electronic device according to claim 1, wherein the luminance control module is further operable to maintain the luminance of the touch panel at a first luminance corresponding to the first condition when contact is made on the touch panel during the first time period.

3. The mobile electronic device according to claim 1, further comprising a memory module operable to store positional information indicating a position on the touch panel where a contact on the touch panel decreases the measured surrounding brightness, wherein the optical sensor is located approximately on a same plane as a display surface of the touch panel.

4. The mobile electronic device according to claim 3, wherein the luminance control module is further operable to:
   change the first time period to a time period longer than the first time period and perform a control when the contact is made on the position on the touch panel when the measured surrounding brightness has changed from the first condition to the second condition, during a period starting from a second time period before the change occurs; and
   change the luminance of the touch panel to the second luminance without performing a control when the contact has not been made on the position on the touch panel.

5. The mobile electronic device according to claim 1, further comprising a condition determination module operable to:
   determine that the measured surrounding brightness has changed from the first condition to the second condition, when the measured surrounding brightness has changed from being equal to or greater than a threshold value to being less than the threshold value; and
   determine that measured surrounding brightness has changed from the second condition to the first condition when the measured surrounding brightness has changed from being less than the threshold value to being equal to or greater than the threshold value.

6. The mobile electronic device according to claim 1, further comprising a condition determination module operable to:
determine that the measured surrounding brightness has changed from the first condition to the second condition when an amount of decrease within a unit time in the measured surrounding brightness changes from being less than the threshold value to being equal to or greater than the threshold value; and
determine that the measured surrounding brightness has changed from the second condition to the first condition, when an amount of increase within the unit time in the measured surrounding brightness changes from being less than the threshold value to being equal to or greater than the threshold value.

7. The mobile electronic device according to claim 1, wherein the luminance control module is further operable to:
maintain the second luminance when the measured surrounding brightness has changed from the first condition to the second condition by a time the first time period elapses from the change; and
change the luminance of the touch panel to the first luminance when the measured surrounding brightness has not changed from the first condition to the second condition by the time the first time period elapses from the change,
if the measured surrounding brightness has changed from the second condition to the first condition.

8. A luminance control method comprising:
measuring a surrounding brightness of a touch panel to obtain a measured surrounding brightness;
maintaining a luminance of the touch panel during a predetermined first time period starting when the measured surrounding brightness changes from a first condition to a second condition, during which the measured surrounding brightness decreases by an amount equal to or greater than a threshold value;
maintaining the luminance of the touch panel at a first luminance corresponding to the first condition when the measured surrounding brightness changes from the second condition to the first condition during the first time period;
adjusting the luminance of the touch panel to change to a second luminance corresponding to the second condition when the measured surrounding brightness has not changed from the second condition to the first condition during the first time period; and
adjusting the luminance of the touch panel to change to the second luminance corresponding to the second condition when there is no contact on the touch panel during a third time period corresponding to an initial portion of the first time period.

9. The method according to claim 8, further comprising maintaining the luminance of the touch panel at a first luminance corresponding to the first condition when contact is made on the touch panel during the first time period.

10. The method according to claim 8, further comprising:
storing positional information indicating a positions on the touch panel where a contact on the touch panel decreases the measured surrounding brightness;
changing the first time period to a time period longer than the first time period;
performing a control when the contact is made on the position on the touch panel when the measured surrounding brightness has changed from the first condition to the second condition, during a period starting from a second time period before the change occurs; and
changing the luminance of the touch panel to the second luminance without performing a control when the contact has not been made on the position on the touch panel.

11. The method according to claim 8, further comprising:
determining that the measured surrounding brightness has changed from the first condition to the second condition, when the measured surrounding brightness has changed from being equal to or greater than a threshold value to being less than the threshold value; and
determining that measured surrounding brightness has changed from the second condition to the first condition when the measured surrounding brightness has changed from being less than the threshold value to being equal to or greater than the threshold value.

12. The method according to claim 8, further comprising:
determining that the measured surrounding brightness has changed from the first condition to the second condition when an amount of decrease within a unit time in the measured surrounding brightness changes from being less than a threshold value to being equal to or greater than the threshold value; and
determining that the measured surrounding brightness has changed from the second condition to the first condition, when an amount of increase within the unit time in the measured surrounding brightness changes from being less than the threshold value to being equal to or greater than the threshold value.

13. The method according to claim 8, further comprising:
maintaining the second luminance when the measured surrounding brightness has changed from the first condition to the second condition by a time the first time period elapses from the change; and
change the luminance of the touch panel to the first luminance when the measured surrounding brightness has not changed from the first condition to the second condition by the time the first time period elapses from the change,
if measured surrounding brightness has changed from the second condition to the first condition.

14. A non-transitory computer readable storage medium comprising computer-executable instructions for performing a luminance control method, the method executed by the computer-executable instructions comprising:
measuring a surrounding brightness of a touch panel to obtain a measured surrounding brightness;
maintaining a luminance of the touch panel during a predetermined first time period starting when the measured surrounding brightness changes from a first condition to a second condition, during which the measured surrounding brightness decreases by an amount equal to or greater than a threshold value;
maintaining the luminance of the touch panel at a first luminance corresponding to the first condition when the measured surrounding brightness changes from the second condition to the first condition during the first time period;
adjusting the luminance of the touch panel to change to a second luminance corresponding to the second condition when the measured surrounding brightness has not changed from the second condition to the first condition during the first time period; and
adjusting the luminance of the touch panel to change to the second luminance corresponding to the second condition when there is no contact on the touch panel during a third time period corresponding to an initial portion of the first time period.

15. The computer readable storage medium according to claim 14, the method executed by the computer-executable instructions further comprising maintaining the luminance of the touch panel at a first luminance corresponding to the first condition when contact is made on the touch panel during the first time period.

16. The computer readable storage medium according to claim 14, the method executed by the computer-executable instructions further comprising:
   storing positional information indicating a position on the touch panel where a contact on the touch panel decreases the measured surrounding brightness;
   changing the first time period to a time period longer than the first time period;
   performing a control when the contact is made on the position on the touch panel when the measured surrounding brightness has changed from the first condition to the second condition, during a period starting from a second time period before the change occurs; and
   changing the luminance of the touch panel to the second luminance without performing a control when the contact has not been made on the position on the touch panel.

17. The computer readable storage medium according to claim 14, the method executed by the computer-executable instructions further comprising:
   determining that the measured surrounding brightness has changed from the first condition to the second condition, when the measured surrounding brightness has changed from being equal to or greater than a threshold value to being less than the threshold value; and
   determining that measured surrounding brightness has changed from the second condition to the first condition when the measured surrounding brightness has changed from being less than the threshold value to being equal to or greater than the threshold value.

18. The computer readable storage medium according to claim 14, the method executed by the computer-executable instructions further comprising:
   determining that the measured surrounding brightness has changed from the first condition to the second condition when an amount of decrease within a unit time in the measured surrounding brightness changes from being less than a threshold value to being equal to or greater than the threshold value; and
   determining that the measured surrounding brightness has changed from the second condition to the first condition, when an amount of increase within the unit time in the measured surrounding brightness changes from being less than the threshold value to being equal to or greater than the threshold value.

* * * * *